(12) United States Patent
Huang et al.

(10) Patent No.: US 10,041,413 B2
(45) Date of Patent: Aug. 7, 2018

(54) IGNITER ASSEMBLY FOR A GAS TURBINE ENGINE

(71) Applicant: GENERAL ELECTRIC COMPANY, Schenectady, NY (US)

(72) Inventors: Fei Huang, Carmel, IN (US); Christophe J. Day, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 265 days.

(21) Appl. No.: 14/731,524

(22) Filed: Jun. 5, 2015

(65) Prior Publication Data
US 2016/0356223 A1    Dec. 8, 2016

(51) Int. Cl.
*F02C 7/266* (2006.01)
*F23R 3/60* (2006.01)
(Continued)

(52) U.S. Cl.
CPC ............... *F02C 7/266* (2013.01); *F02C 7/28* (2013.01); *F23R 3/002* (2013.01); *F23R 3/02* (2013.01);
(Continued)

(58) Field of Classification Search
CPC .. F02C 7/26; F02C 7/264; F02C 7/266; F02C 7/28; F23R 2900/00012;
(Continued)

(56) References Cited

U.S. PATENT DOCUMENTS

| 1,474,661 A | 11/1923 | Berglof |
| 2,604,510 A | 7/1952 | Berkey |

(Continued)

FOREIGN PATENT DOCUMENTS

| CA | 2147019 A1 | 10/1995 |
| CN | 1490563 A | 4/2004 |

(Continued)

OTHER PUBLICATIONS

Extended European Search Report and Opinion issued in connection with corresponding EP Application No. 16172478.6 dated Oct. 20, 2016.

(Continued)

*Primary Examiner* — Gerald L Sung
*Assistant Examiner* — Alain Chau
(74) *Attorney, Agent, or Firm* — General Electric Company; Pamela Kachur

(57) ABSTRACT

In one aspect the present subject matter is directed to an igniter assembly for a gas turbine engine. The igniter assembly includes an outer housing and an igniter tube that extends radially through the outer housing. The igniter tube includes an ignition tip, a nut coupled to the igniter tube and disposed at least partially within the outer housing and a biasing member that extends between an inner surface of a top portion of the outer housing and the nut. A flexible seal extends radially inwardly from a bottom side of the nut and a retention collar is coupled to the igniter tube proximate to the ignition tip. The retention collar is configured to couple to a mounting ring connected to an outer liner of a combustor for the gas turbine engine.

16 Claims, 4 Drawing Sheets

(51) Int. Cl.
*F23R 3/00* (2006.01)
*F23R 3/02* (2006.01)
*F02C 7/28* (2006.01)

(52) U.S. Cl.
CPC ............ *F23R 3/60* (2013.01); *F05D 2220/32* (2013.01); *F05D 2230/642* (2013.01); *F05D 2240/55* (2013.01); *F05D 2260/36* (2013.01); *F05D 2260/941* (2013.01); *F05D 2260/99* (2013.01); *F23R 2900/00012* (2013.01); *Y02T 50/672* (2013.01)

(58) Field of Classification Search
CPC .. F23R 2900/00001; F23R 3/002; F23R 3/60; F23R 3/02; F05D 2260/99; F05D 2260/941; F05D 2260/36; F05D 2240/55; F05D 2230/642; F23Q 3/00
See application file for complete search history.

(56) References Cited

U.S. PATENT DOCUMENTS

| | | | |
|---|---|---|---|
| 3,048,015 A | 8/1962 | Roland et al. | |
| 3,910,036 A | 10/1975 | Irwin | |
| 4,275,559 A | 6/1981 | Blair | |
| 4,815,276 A * | 3/1989 | Hansel | F01D 25/00 415/118 |
| 5,402,637 A | 4/1995 | Adam | |
| 5,636,511 A | 6/1997 | Pfefferle et al. | |
| 5,660,043 A | 8/1997 | Pfefferle et al. | |
| 5,720,163 A | 2/1998 | Pfefferle et al. | |
| 5,838,094 A | 11/1998 | Hanspal | |
| 6,438,940 B1 | 8/2002 | Vacek et al. | |
| 6,442,929 B1 | 9/2002 | Kraft et al. | |
| 6,644,276 B2 | 11/2003 | Yoshikawa | |
| 6,748,735 B2 | 6/2004 | Schmotolocha et al. | |
| 6,920,762 B2 | 7/2005 | Wells et al. | |
| 6,952,927 B2 | 10/2005 | Howell et al. | |
| 8,099,963 B2 | 1/2012 | Pieussergues | |
| 8,171,719 B2 | 5/2012 | Ryan et al. | |
| 2003/0163995 A1 | 9/2003 | White | |
| 2004/0118121 A1* | 6/2004 | Parkman | F23R 3/283 60/740 |
| 2004/0237532 A1 | 12/2004 | Howell et al. | |
| 2005/0072163 A1 | 4/2005 | Wells et al. | |
| 2009/0064657 A1 | 3/2009 | Zupanc et al. | |
| 2009/0178385 A1 | 7/2009 | Sandelis | |
| 2011/0113748 A1 | 5/2011 | Lains et al. | |
| 2013/0195546 A1* | 8/2013 | Ponziani | F23R 3/60 403/327 |
| 2014/0007580 A1* | 1/2014 | Richardson | F23R 3/02 60/754 |
| 2014/0137567 A1 | 5/2014 | Park et al. | |
| 2014/0144148 A1* | 5/2014 | Jause | F02C 7/20 60/772 |
| 2014/0352323 A1 | 12/2014 | Bennet et al. | |
| 2016/0369701 A1* | 12/2016 | Pireyre | F02C 7/266 |

FOREIGN PATENT DOCUMENTS

| | | | | |
|---|---|---|---|---|
| CN | 101270688 A | | 9/2008 | |
| CN | 102563718 A | | 7/2012 | |
| CN | 202303372 U | | 7/2012 | |
| CN | 202675591 U | | 1/2013 | |
| CN | 203269884 U | | 11/2013 | |
| EP | 1443190 A1 | | 8/2009 | |
| EP | 2559882 A1 | | 2/2013 | |
| JP | 5130904 U | | 3/1976 | |
| JP | 5257106 U | | 4/1977 | |
| JP | 58112864 U | | 8/1983 | |
| JP | S59-190940 | * | 12/1984 | ............ F02C 7/266 |
| JP | 2001221103 A | | 8/2001 | |
| WO | WO 2015097355 A1 | * | 7/2015 | ............ F02C 7/266 |

OTHER PUBLICATIONS

Office Action issued in connection with corresponding CA Application No. 2931132 dated Mar. 10, 2017.

Decision to Grant issued in connection with corresponding JP Application No. 2016-109661 dated Jun. 6, 2017.

First Office Action and Search issued in connection with corresponding CN Application No. 201610391599.5 dated Jul. 10, 2017.

\* cited by examiner

IGNITER ASSEMBLY FOR A GAS TURBINE ENGINE

FIELD OF THE INVENTION

The present subject matter relates generally to a gas turbine engine. More particularly, the present subject matter relates to an igniter assembly for a gas turbine engine portion of a turbofan engine.

BACKGROUND OF THE INVENTION

A turbofan engine generally includes a fan assembly and a core gas turbine engine. The gas turbine engine includes, in serial flow order, a low pressure compressor, a high pressure compressor, a combustion section, a high pressure turbine and a low pressure turbine. A high pressure shaft couples the high pressure compressor to the high pressure turbine. A low pressure shaft extends coaxially within the high pressure shaft and couples the low pressure compressor to the low pressure turbine. The fan assembly includes a plurality of fan blades coupled to a fan shaft and disposed upstream from an inlet of the low pressure compressor. The fan shaft is coupled to the low pressure shaft via a gearbox. In particular configurations, an outer casing or nacelle circumscribes the fan blades and at least a portion of the gas turbine engine. A bypass air passage is defined between an outer casing of the gas turbine engine and the nacelle.

The combustion section generally includes an annular inner liner, an annular outer liner radially spaced from the inner liner and a combustor dome coupled to upstream or forward ends of the inner and outer liners. A fuel injector or nozzle extends through the dome and is configured to provide a fuel/air mixture to a combustion chamber that is defined between the inner and outer liners. An outer casing circumferentially surrounds the outer liner and at least partially defines an outer plenum or passage therebetween.

The combustion section further includes an ignition system having one or more igniter assemblies mounted or coupled to the outer casing. An igniter portion of the igniter assembly extends generally radially through the outer casing and the outer plenum. An ignition tip portion of the igniter extends at least partially through an opening defined within the outer liner. During operation of the gas turbine, such as during light-off or restart, the igniter may be energized to provide a spark at the ignition tip so as to ignite the fuel/air mixture within the combustion chamber.

Radial and/or axial positioning of the ignition tip with respect to the outer liner and/or the combustion chamber may change during operation of the gas turbine. For example, varying thermal growth rates of the outer casing and the outer liner and/or g-forces may result in over immersion of the ignition tip into the flow of extremely hot combustion gases, thus resulting in undesirable thermal fatigue of the igniter. In addition or in the alternative, varying thermal growth rates of the outer casing and the outer liner and/or g-forces may cause the ignition tip to lift radially out of the opening defined within the outer liner, thus potentially affecting the ability to light off the combustor. Consequently, an improved ignition system for a gas turbine engine would be useful in the turbofan engine industry.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for. The system includes an igniter assembly for a gas turbine engine. The igniter assembly includes an outer housing and an igniter tube that extends radially through the outer housing. The igniter tube includes an ignition tip. A nut is coupled to the igniter tube and disposed at least partially within the outer housing. A biasing member at least partially surrounds a portion of the igniter tube within the outer housing. The biasing member extends between an inner surface of a top portion of the outer housing and the nut. A flexible seal extends radially inwardly from a bottom side of the nut. A retention collar is coupled to the igniter tube proximate to the ignition tip. The retention collar is configured to couple to a mounting ring connected to an outer liner of a combustor for the gas turbine engine.

Another aspect of the present subject matter is directed to a combustion section of a gas turbine engine. The combustion section includes an inner liner and an outer liner that is radially spaced from the inner liner. The outer liner defines an opening that extends radially therethrough. A combustion chamber is defined between the inner and outer liners. An outer casing extends circumferentially around the outer liner. The outer liner and the outer casing define an outer flow passage therebetween. The outer casing includes an opening substantially aligned with the opening of the outer liner. The combustion section further includes a fuel igniter assembly. The fuel igniter assembly comprises an outer housing that is coupled to the outer casing. An igniter tube extends radially through outer housing and the opening of the outer casing. The igniter tube has an ignition tip that extends at least partially through the opening of the outer liner. A nut is coupled to the igniter tube and disposed at least partially within the outer housing. A biasing member at least partially surrounds a portion of the igniter tube within the outer housing. The biasing member extends between an inner surface of a top portion of the outer housing and the nut. A flexible seal extends radially inwardly from a bottom side of the nut towards the outer casing. A retention collar is coupled to the igniter tube proximate to the ignition tip. The retention collar is coupled to a mounting ring that is fixedly connected to the outer liner.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
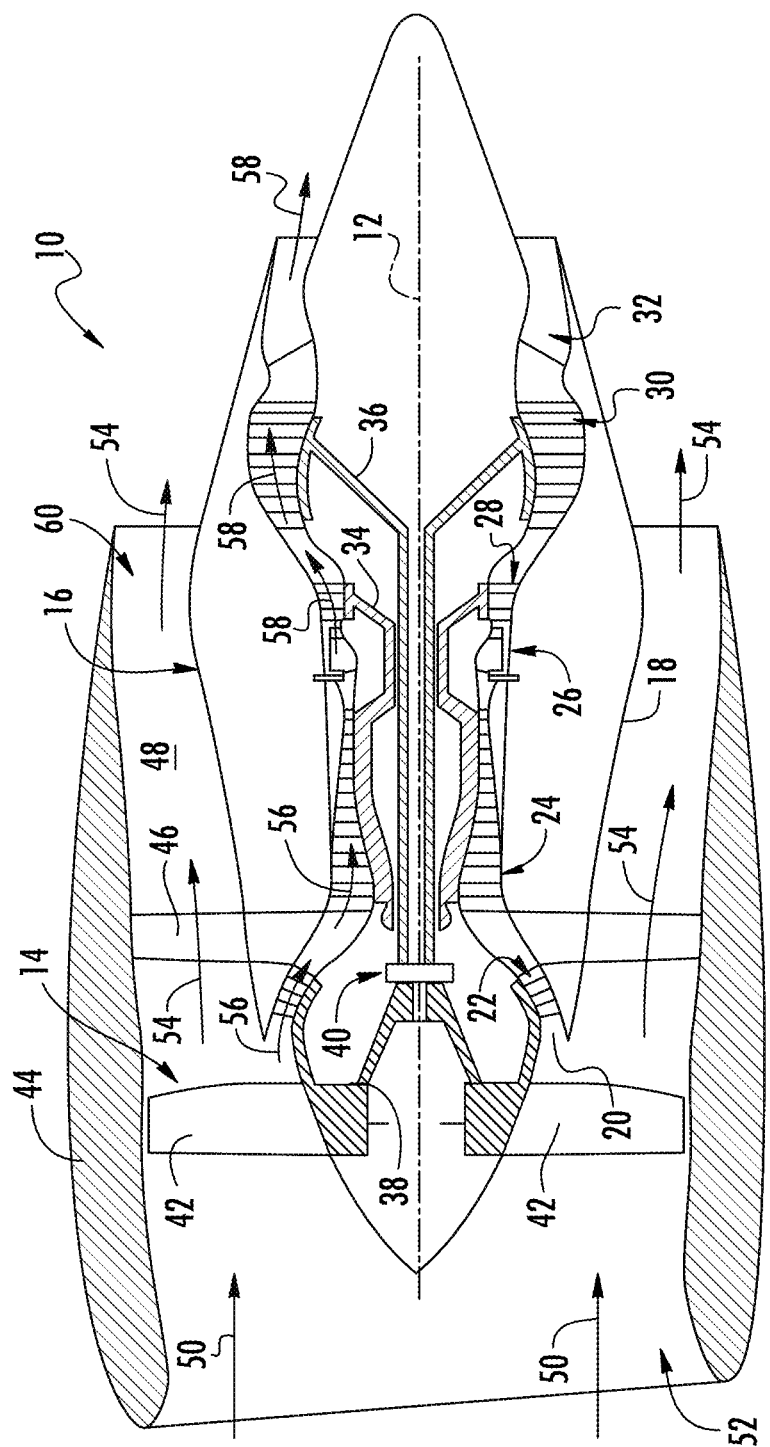
FIG. 1 is a schematic cross-sectional view of an exemplary turbofan jet engine as may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the drawings, wherein identical numerals indicate the same elements throughout the figures, FIG. 1 is a schematic partially cross-sectioned side view of an exemplary turbofan jet engine 10 herein referred to as "turbofan 10" as may incorporate various embodiments of the present invention. As shown in FIG. 1, the turbofan 10 has a longitudinal or axial centerline axis 12 that extends therethrough for reference purposes. In general, the turbofan 10 may include a fan assembly 14 and a core turbine engine or gas turbine engine 16 disposed downstream from the fan assembly 14.

The core turbine engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan rotor shaft or fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core turbine engine 16. It should be appreciated by those of ordinary skill in the art that the nacelle 44 may be configured to be supported relative to the core turbine engine 16 by a plurality of circumferentially-spaced outlet guide vanes or struts 46. Moreover, at least a portion of the nacelle 44 may extend over an outer portion of the core turbine engine 16 so as to define a bypass airflow passage 48 therebetween.

During operation of the turbofan 10, a volume of air as indicated by arrows 50 enters the turbofan 10 through an associated inlet 52 of the nacelle 44 and/or fan assembly 14. As the volume of air 50 passes across the fan blades 42 a first portion of the air as indicated by arrows 54 is directed or routed into the bypass airflow passage 48 while a second portion of the air as indicated by arrow 56 is directed or routed into the LP compressor 22. The pressure of the second portion of air 56 is then increased as it is routed through the LP and HP compressors 22, 24. The second portion of air 56 is then routed into the combustion section 26 where it is mixed with fuel and burned to provide combustion gases 58.

The combustion gases 58 are routed through the HP turbine 28, thus causing the HP rotor shaft 34 to rotate, thereby supporting operation of the HP compressor 24. The combustion gases 58 are then routed through the LP turbine 30, thus causing the LP rotor shaft 36 to rotate, thereby supporting operation of the LP compressor 22 and/or rotation of the fan shaft 38. The combustion gases 58 are then routed through the jet exhaust nozzle section 32 of the core turbine engine 16 to provide propulsive thrust. Simultaneously, the pressure of the first portion of air 54 is substantially increased as the first portion of air 54 is routed through the bypass airflow passage 48 before it is exhausted from a fan nozzle exhaust section 60 of the turbofan 10, thus providing propulsive thrust.

Figure 2:
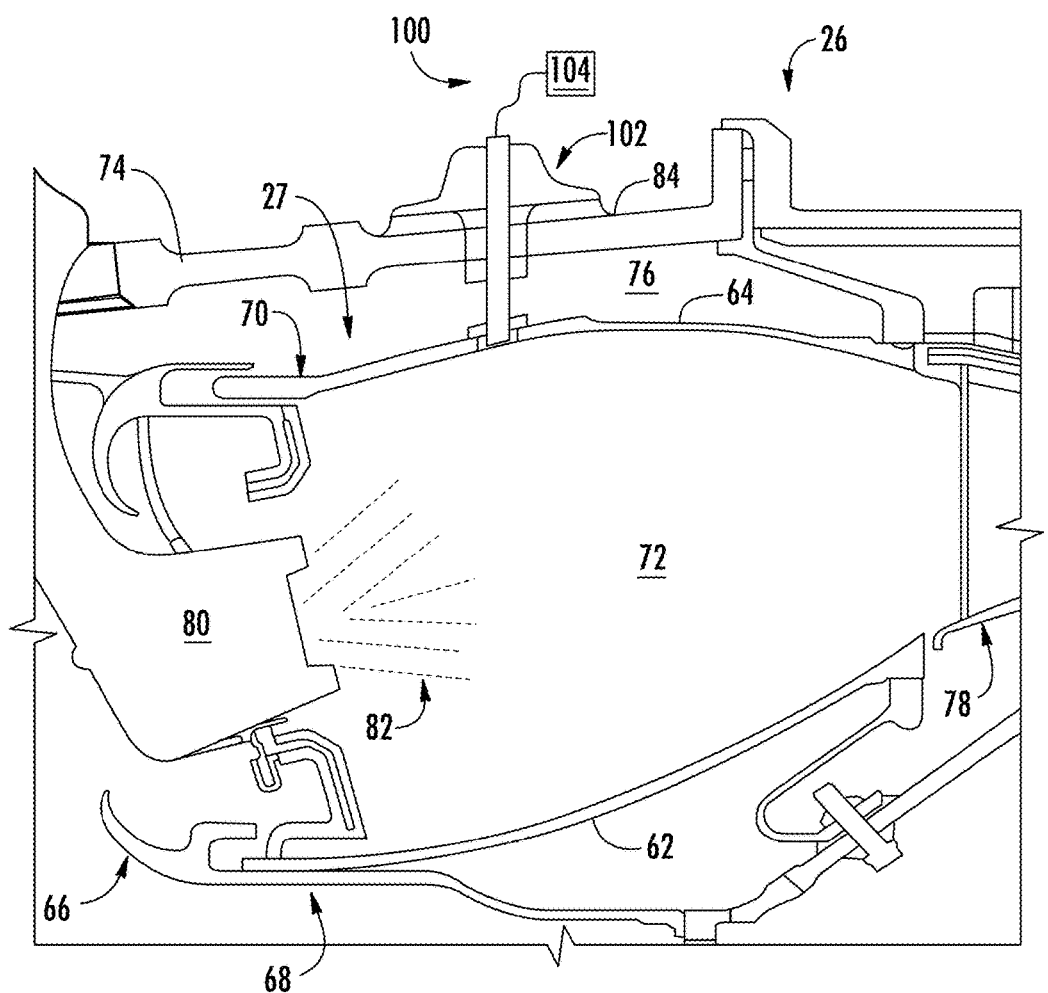
FIG. 2 is a cross sectional side view of a portion of a combustion section of the turbofan jet engine as shown in FIG. 1, as may incorporate various embodiments of the present invention.

FIG. 2 is a cross sectional side view of a portion of the combustion section 26 as may incorporate various embodiments of the present invention. As shown in FIG. 2, the combustor section 26 generally includes an annular type combustor 27 having an annular inner liner 62, an annular outer liner 64 and a domed end 66 that extends between upstream ends 68, 70 of the inner liner 62 and the outer liner 64 respectfully. The inner liner 62 is radially spaced from the outer liner 64 and defines generally annular combustion chamber 72 therebetween. In particular embodiments, the inner liner 62 and/or the outer liner 64 may be at least partially or entirely formed from metal alloys or ceramic matrix composite (CMC) materials.

The inner liner 62 and the outer liner 64 are encased within a combustor or outer casing 74. An outer flow passage 76 may be defined between the outer casing 74 and the outer liner 64. The inner liner 62 and the outer liner 64 extend from the domed end 66 towards a turbine nozzle 78. A fuel injector or nozzle 80 extends at least partially through the domed end 66 and provides a fuel-air mixture 82 to the combustion chamber 72.

In various embodiments, as shown in FIG. 2, the combustion section 26 includes an ignition system 100 for igniting the fuel-air mixture 82 within the combustion chamber 72. The fuel ignition system 100 generally includes at least one fuel igniter assembly 102 that is electrically/electronically coupled to a controller or ignition source 104. The igniter assembly 102 may be connected to an outer surface 84 of the outer casing 74.

Figure 3:
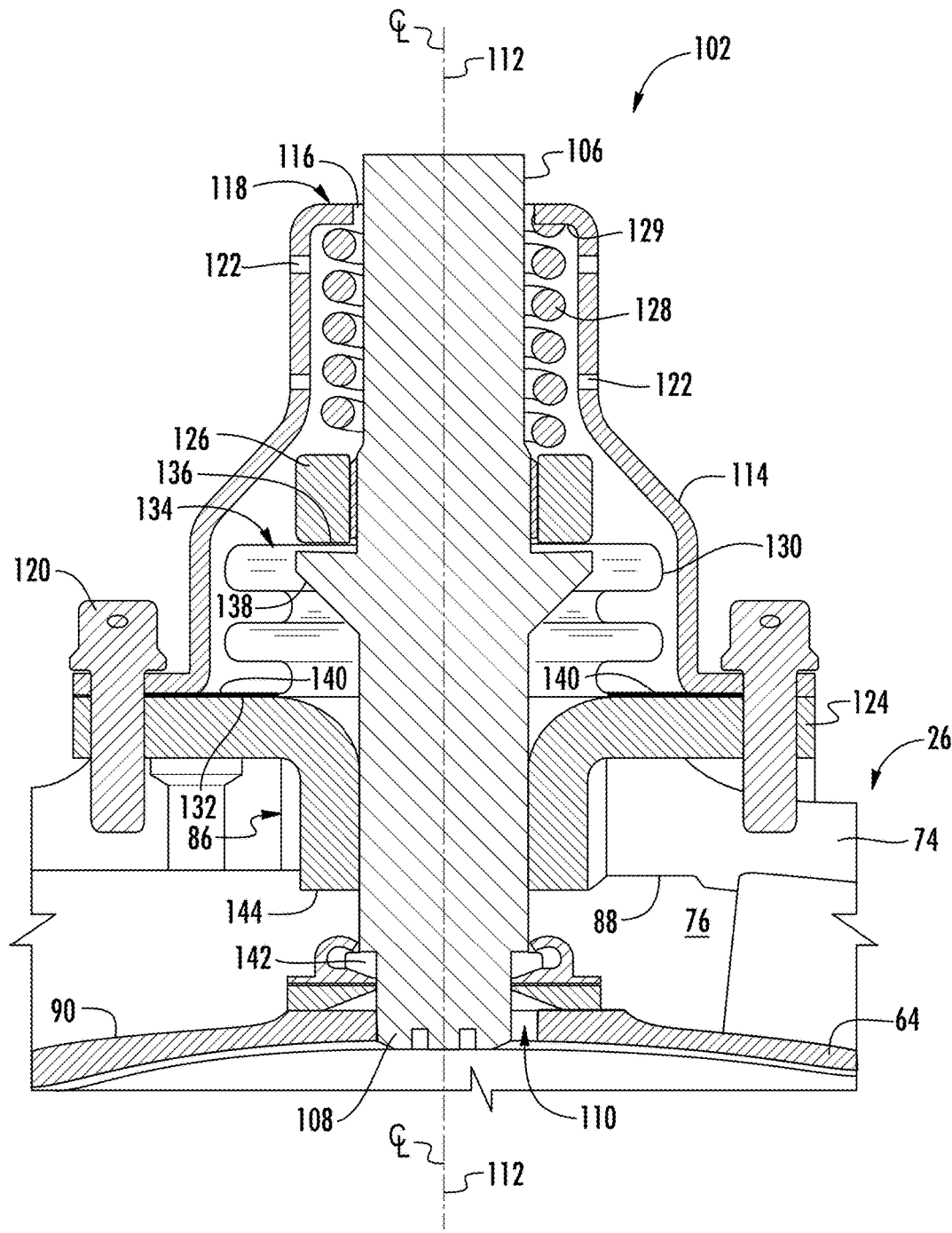
FIG. 3 is an enlarged view of enlarged cross sectional view of a portion of the combustion section as shown in FIG. 2, including a fuel igniter assembly according to an exemplary embodiment of the present invention.

FIG. 3 provides an enlarged cross sectional view of a portion of the combustion section 26 including the fuel igniter assembly 102 as shown in FIG. 2, according to an exemplary embodiment of the present invention. In the exemplary embodiment, as shown in FIG. 3, the fuel igniter assembly 102 includes an igniter tube 106 that extends generally radially through an opening 86 defined within and/or by the outer casing 74 and the outer flow passage 76. An ignition tip or tip portion 108 of the igniter tube 106 extends at least partially through an opening 110 defined within the outer liner 64. In particular embodiments, the ignition tip 108 may be concentrically aligned with respect to the opening 110 and with respect to a radial centerline 112 of the igniter tube 106.

In the exemplary embodiment, as shown in FIG. 3, fuel igniter assembly 102 includes an outer housing or body 114. In particular embodiments, the outer housing 114 includes an opening 116 defined along a top portion 118 of the outer housing 114. The opening 116 may be sized and/or shaped for receiving the igniter tube 106 and/or for allowing the igniter tube 106 to translate radially therein with respect to centerline 12 (FIG. 1). A portion of the igniter tube 106 may extend through and radially outwardly from the opening 116. The outer housing 114 may be configured to couple to the outer casing 74 and may at least partially form a seal around opening 86. For example, the outer housing 114 may be coupled to the outer casing 74 via bolts 120 or other mechanical fastening means. In particular embodiments, the outer housing 114 may include one or more ventilation ports 122.

An annular adapter or spacer 124 may be disposed radially between the outer housing 114 and the outer casing 74. The igniter tube 106 extends radially through the spacer 124. The spacer 124 may extend at least partially through the opening 86 defined in the outer casing 74 and towards the outer liner 64. For example, in one embodiment, a portion of the spacer 124 extends through opening 86 and into the outer flow passage 76.

In the exemplary embodiment, a nut 126 extends at least partially circumferentially around the igniter tube 106. The nut 126 may be at least partially encased within the outer housing 114. In particular embodiments, the nut 126 may be threadingly engaged with the igniter tube 106 to allow for radial position adjustments to the nut 126 along the igniter tube 106. A spring or biasing member 128 extends circumferentially around a portion of the igniter tube 106 and is disposed between the nut 126 and an inner surface 129 of the outer housing 114. In one embodiment, the biasing member 128 may be a coil spring. In one embodiment, the biasing member 128 may be a wave spring. The biasing member 128 generally provides a radially inward force against the nut 126 and/or the igniter tube 106 so as to bias the igniter tube 106 through opening 86 and/or through the spacer towards the outer liner 64.

In the exemplary embodiment, the igniter assembly 102 includes an annular flex or flexible seal 130 such as but not limited to a bellows seal as shown in FIG. 3. The flexible seal 130 extends circumferentially around a portion of the igniter tube 106 and is disposed between the nut 126 and a top surface 132 of the spacer 124. The flexible seal 130 will flex radially without compromising its sealing capabilities. A first end portion 134 of the flexible seal 130 may be sealed and/or positioned between a bottom side 136 of the nut 126 and a landing surface or collar 138 that extends outwardly from the igniter tube 106 in a direction that is generally perpendicular to radial centerline 112 of the igniter tube 106. The collar 138 may be formed as part of the igniter tube 106 or may be fixedly attached to the igniter tube 106. For example, the collar 138 may be formed by a nut, washer or the like.

In the exemplary embodiment, nut 126 may be tightened against the first end portion 134 of the flexible seal 130, thus at least partially forming a seal between nut 126 and the collar 138. A bottom portion 140 of the flexible seal 130 may be sealed against and/or to the top surface 132 of the spacer 124. For example, the bottom portion 140 may be brazed, welded or otherwise sealed or attached to the top surface 132 of the spacer 124. In the exemplary embodiment, the biasing member 128, the nut 126 and the flexible seal 130 are each positioned entirely outside of the outer flow passage 76 and outside of the outer casing 74.

In the exemplary embodiment, an annular sleeve or retention collar 142 is fixedly connected to and/or at least partially formed by the igniter tube 106 proximate to the ignition tip 108. The retention collar 142 extends outwardly from the igniter tube 106 in a direction that is generally perpendicular to the radial centerline 112 of the igniter tube 106. When the igniter assembly 102 is mounted to the combustor outer casing 74, the retention collar 142 is disposed between an inner surface 88 of the outer casing 74 and/or a bottom surface 144 of the spacer 124, and an outer surface 90 of the outer liner 64.

Figure 4:
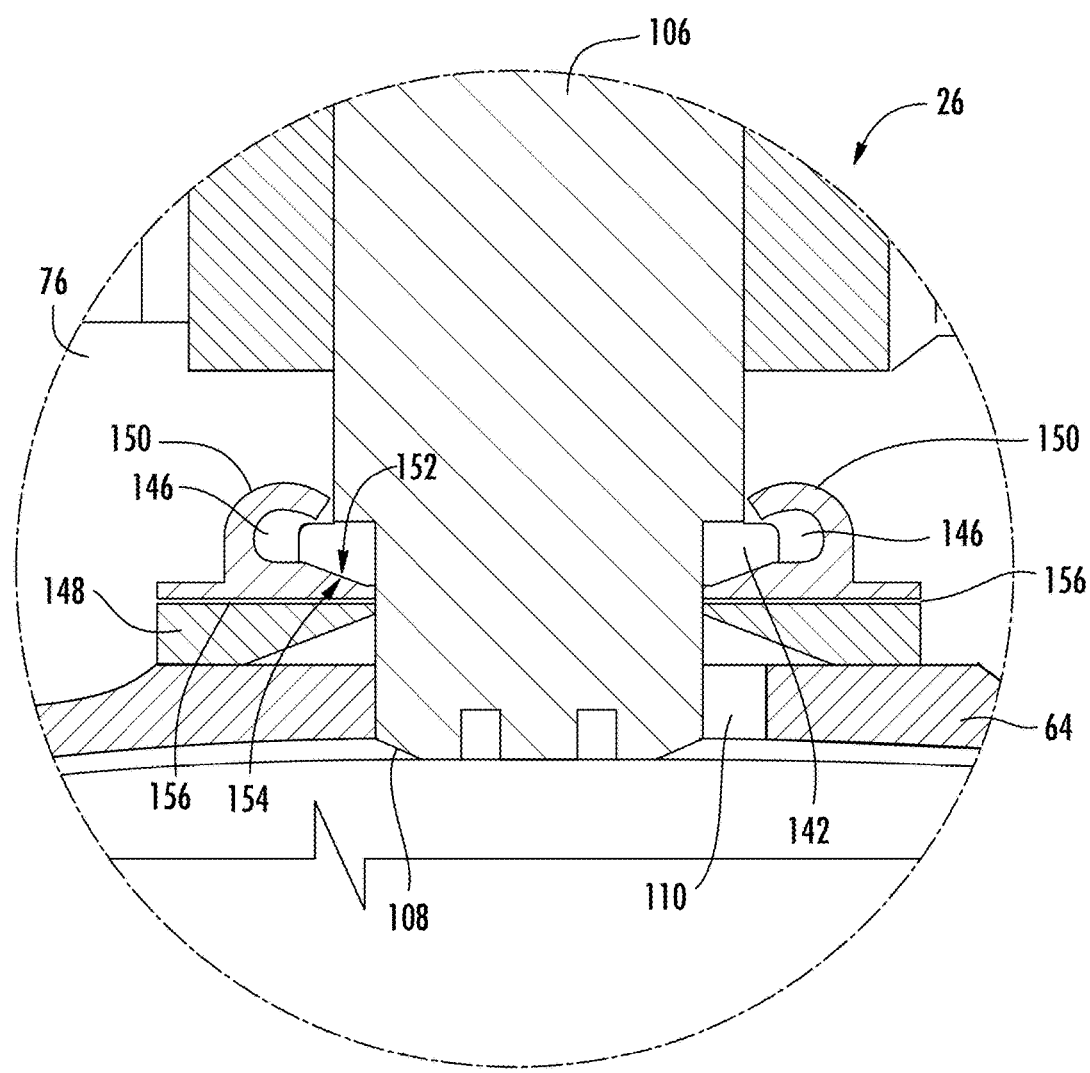
FIG. 4 is an enlarged cross sectional view of a portion of the combustion section including a portion of the fuel igniter assembly as shown in FIG. 3, according to at least one embodiment of the present invention.

FIG. 4 is an enlarged cross sectional view of a portion of the combustion section 26 as shown in FIG. 3 and includes, at least in part, the ignition tip 108 of the igniter tube 106 and a portion of the outer liner 64. In the exemplary embodiment, as shown in FIG. 4, the retention collar 142 is formed and/or shaped to mount within a pocket or slot 146 of a mounting ring or ferrule 148. The mounting ring 148 may be concentrically aligned with the opening 110 defined by the outer liner 64. The mounting ring 148 is fixedly connected to the outer liner 64. For example, the mounting ring 148 may be welded, brazed, bolted or otherwise fixedly connected to the outer liner 64. The mounting ring 148 may include tabs 150 or other like features or devices for locking or coupling the retention collar 142 within the pocket 146. For example, in other embodiments, the retention collar 142 may be coupled within the pocket 146 via a washer and/or a bolt or other fastener (not shown).

In particular embodiments, at least a portion of an outer surface 152 of the retention collar 142 may be shaped or formed complementary to an inner surface 154 of the pocket 146. For example, in one embodiment, a portion of the outer surface 152 and a portion of the inner surface 154 of the pocket 146 may be spherical and/or arcuate to form a ball and socket type joint therebetween, thus allowing for relative movement between the outer liner 64 and the outer casing 74 during operation of the gas turbine engine 10. In particular embodiments, the mounting ring 148 may include one or more cooling air passages 156 that are in fluid communication with the outer flow passage During operation, the outer liner 64 may move radially and/or axially with respect to the outer casing 74. This relative movement may be caused by a number of factors including varying thermal growth rates between the outer liner 64 and the outer casing 74 and/or g-forces on the gas turbine engine 16 such as during take-off, landing or general maneuvering of an aircraft to which the turbofan 10 is attached. By locking or retaining the retention collar 142 in the pocket 146 of the mounting ring 148, radial positioning of the ignition tip 108 within the opening 110 of the outer liner 64 and with respect to the combustion chamber 72 may be maintained throughout operation of the gas turbine engine 16 because the igniter tube 106 and thus the ignition tip 108 will travel radially and/or axially with the outer liner 64 as it moves with respect to the outer casing 74. As a result, the ignition tip 108 may be maintained in a desired radial position so as to light or re-light the fuel-air mixture within the combustion chamber 72. In addition, by fixing the igniter tube 106 to the outer liner 64, the ignition tip 108 will not become over immersed within the flow of combustion gases 58, thus reducing thermal fatigue to the igniter tube 106 and particularly to the ignition tip 108.

The radially inward force provided by the biasing member 128 may dampen the igniter tube 106 as it travels with the outer liner 64 and/or may help maintain proper radial positioning of the outer liner 64 with respect to the outer casing 74. The flexible seal 130 may prevent leakage of compressed air 56 from escaping from the outer flow passage 76. The ventilation ports 122 may allow for ventilation of heat from inside the outer housing 114, thus reducing thermal fatigue on one or more of the biasing member 128, the nut 126 and/or the spring 128. The cooling air passages 156 may provide cooling flow from the outer flow passage 76 to the ignition tip 108, thus cooling the ignition tip 108.

The embodiments as described herein and as illustrated in FIGS. 3 and 4, provide various improvements and/or technical benefits over known or existing spark ignition systems. For example, the ignition tip 108 is always held fixed relative to the outer liner 64, thus eliminating relative movement of the ignition tip 108 with respect to the outer liner 64. On large engines particularly, this relative movement may cause field durability and maintainability issues. Various embodiments of the present invention may improve flight safety and reduce maintenance cost and off-line time.

In addition or in the alternative, by eliminating recession of the ignition tip 108 from the outer liner, re-light margin may be improved. In addition or in the alternative, immersion or over immersion of the ignition tip 108 into the flow of combustion gases improves ignition tip 108 thermal and/or mechanical life in the field. In addition or in the alternative, the various embodiments provided are compatible with both metal and composite matric ceramic liners. In addition or in the alternative, the location of the ignition tip 108 is may not be as sensitive to radial case creep as with known ignition systems. In addition or in the alternative, the ignition system 100, particularly the igniter assembly 102 provided herein may minimize thermal gradients in the igniter region of the outer liner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An igniter assembly for a combustor of a gas turbine engine, comprising:
    an outer housing;
    an igniter tube that extends radially through the outer housing so that the igniter tube passes through an outer flow passage disposed radially outside of an outer liner of the combustor, the igniter tube having an ignition tip;
    a nut threadingly coupled to and surrounding the igniter tube and disposed at least partially within the outer housing;
    a biasing member at least partially surrounding a portion of the igniter tube within the outer housing, the biasing member extending between an inner surface of a top portion of the outer housing and a top side of the nut, and the biasing member applying a radially inward force upon the top side of the nut;
    a flexible seal that extends radially inwardly from a bottom side of the nut;
    a collar extending outward from the igniter tube within the outer housing, wherein a first end portion of the flexible seal is sealed between the bottom side of the nut and a top surface of the collar;
    a spacer positioned radially between the outer housing and the outer liner of the combustor and having a first surface coupled to the outer housing, wherein a second end portion of the flexible seal is sealed against the first surface of the spacer; and
    a retention collar coupled to the igniter tube proximate to the ignition tip, wherein the retention collar is configured to couple to a mounting ring, said mounting ring having a cooling air passage and being fixedly connected to the outer liner so that the ignition tip is retained at the radial position of the outer liner, wherein the cooling air passage provides cooling flow from the outer flow passage to the ignition tip to cool down the ignition tip.

2. The igniter assembly as in claim 1, wherein the outer housing defines an opening positioned along a top portion of the outer housing, wherein a portion of the igniter tube extends radially through the opening.

3. The igniter assembly as in claim 1, wherein the outer housing defines one or more ventilation ports.

4. The igniter assembly as in claim 1, wherein the igniter tube extends radially through the spacer.

5. The igniter assembly as in claim 1, wherein the biasing member is a wave spring.

6. The igniter assembly as in claim 1, wherein the biasing member is a coil spring.

7. The igniter assembly as in claim 1, wherein at least a portion of an outer surface of the retention collar is spherical or arcuate.

8. A combustion section of a gas turbine engine, comprising:
    an inner liner and an outer liner radially spaced from the inner liner, the outer liner defining an opening that extends radially therethrough;
    a combustion chamber defined between the inner and outer liners;
    an outer casing that extends circumferentially around the outer liner, wherein the outer liner and the outer casing define an outer flow passage therebetween, wherein the outer casing includes an opening substantially aligned with the opening of the outer liner; and
    a fuel igniter assembly, the fuel igniter assembly comprising:
    an outer housing coupled to the outer casing;
    an igniter tube that extends radially through outer housing and the opening of the outer casing, the igniter tube having an ignition tip that extends at least partially through the opening of the outer liner;
    a nut threadingly coupled to and surrounding the igniter tube and disposed at least partially within the outer housing;
    a biasing member at least partially surrounding a portion of the igniter tube within the outer housing, the biasing member extending between an inner surface of a top portion of the outer housing and a top side of the nut, and the biasing member applying a radially inward force upon the top side of the nut;

a flexible seal that extends radially inwardly from a bottom side of the nut towards the outer casing;

a collar extending outward from the igniter tube within the outer housing, wherein a first end portion of the flexible seal is sealed between the bottom side of the nut and a top surface of the collar;

a spacer having a first surface coupled to the outer housing and a second surface coupled to the outer casing, wherein a second end portion of the flexible seal is sealed against the first surface of the spacer; and a retention collar coupled to the igniter tube proximate to the ignition tip, wherein the retention collar is coupled to a mounting ring, said mounting ring having a cooling air passage and being fixedly connected to the outer liner so that the ignition tip is retained at the radial position of the outer liner, wherein the cooling air passage provides cooling flow from the outer flow passage to the ignition tip to cool down the ignition tip.

9. The combustion section as in claim 8, wherein the outer housing defines an opening positioned along a top portion of the outer housing, wherein a portion of the igniter tube extends radially through the opening.

10. The combustion section as in claim 8, wherein the outer housing defines one or more ventilation ports.

11. The combustion section as in claim 8, wherein the spacer is disposed within the opening of the outer casing, wherein the igniter tube extends radially through the spacer.

12. The combustion section as in claim 8, wherein the biasing member is a wave spring.

13. The combustion section as in claim 8, wherein the biasing member is a coil spring.

14. The combustion section as in claim 8, wherein at least a portion of an outer surface of the retention collar is arcuate.

15. The combustion section as in claim 14, wherein at least a portion of an inner surface of the mounting ring is arcuate.

16. The combustion section as in claim 8, wherein the mounting ring includes one or more cooling air passages in fluid communication with the outer flow passage.

* * * * *